United States Patent
Tanaka et al.

(10) Patent No.: US 8,209,089 B2
(45) Date of Patent: Jun. 26, 2012

(54) VEHICULAR STEERING APPARATUS

(75) Inventors: Hideyuki Tanaka, Chiyoda-ku (JP);
Takanori Matsunaga, Chiyoda-ku (JP);
Kyohei Koyama, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 609 days.

(21) Appl. No.: 12/015,784

(22) Filed: Jan. 17, 2008

(65) Prior Publication Data

US 2008/0208407 A1 Aug. 28, 2008

(30) Foreign Application Priority Data

Feb. 28, 2007 (JP) ................................. 2007-049351

(51) Int. Cl.
*A01B 69/00* (2006.01)
*B62D 6/00* (2006.01)
*B62D 11/00* (2006.01)
*B62D 12/00* (2006.01)
*B63G 8/20* (2006.01)
*B63H 25/04* (2006.01)
*G05D 1/00* (2006.01)
*G06F 7/00* (2006.01)
*G06F 17/00* (2006.01)
*G06F 19/00* (2006.01)

(52) U.S. Cl. ............ 701/41; 701/42; 180/6.44; 180/400; 180/443

(58) Field of Classification Search .................... 701/41; 280/5.51; 180/6.2, 6.24, 6.44, 6.6, 9.38, 180/9.44, 204, 213, 400, 410, 443; 116/31; 340/465; 318/560

See application file for complete search history.

(56) References Cited

U.S. PATENT DOCUMENTS

| | | | | |
|---|---|---|---|---|
| 5,528,497 A | * | 6/1996 | Yamamoto et al. | 701/41 |
| 5,774,819 A | * | 6/1998 | Yamamoto et al. | 701/41 |
| 6,112,845 A | * | 9/2000 | Oyama et al. | 180/443 |
| 7,676,309 B2 | * | 3/2010 | Tamaki et al. | 701/41 |
| 2005/0067214 A1 | * | 3/2005 | Tanaka et al. | 180/446 |

FOREIGN PATENT DOCUMENTS

| | | |
|---|---|---|
| DE | 698 01 849 T2 | 6/2002 |
| DE | 103 48 792 B3 | 5/2005 |
| DE | 10 2005 041 086 A1 | 3/2006 |
| JP | 8268309 A | 10/1996 |
| JP | 200025630 A | 1/2000 |
| JP | 2002264832 A | 9/2002 |
| JP | 2003-312521 A | 11/2003 |

* cited by examiner

*Primary Examiner* — Jack W Keith
*Assistant Examiner* — Rami Khatib
(74) *Attorney, Agent, or Firm* — Sughrue Mion, PLLC (57) ABSTRACT

A vehicular steering apparatus can accurately detect occurrence of a disturbance even where steering torque is limited, and can achieve a low cost and simple construction. The apparatus includes a road surface reaction torque detector that detects an actual road surface reaction torque received by tires of a vehicle from a road surface, a vehicle speed detector that detects a vehicle speed, a steering wheel angle detector that detects a steering angle of a steering wheel, a target road surface reaction torque calculation section that calculates a target road surface reaction torque based on the vehicle speed and the steering wheel angle, and a disturbance occurrence detection section that detects occurrence of a disturbance to the vehicle and outputs a disturbance state signal. The disturbance occurrence detection section includes a sign comparison section that compares signs of the actual and target road surface reaction torques.

8 Claims, 8 Drawing Sheets

VEHICULAR STEERING APPARATUS

BACKGROUND OF THE INVENTION

1. Field of the Invention

The present invention relates to a vehicular steering apparatus equipped with a disturbance occurrence detection unit for detecting the occurrence of a disturbance to a vehicle.

2. Description of the Related Art

In general, when a vehicle receives a strong crosswind during traveling or come into a rough road surface, the driver's control on the steering wheel of the vehicle would be lost by a disturbance to the vehicle, and the driver's feeling of steering stability might probably be lost.

Accordingly, it is necessary to detect the occurrence of the disturbance in an accurate manner so as to assist the steering torque by means of an electric motor for example to perform stabilization control of the vehicle.

In order to detect the occurrence of a disturbance, a known electric power steering apparatus is provided with a steering torque detection unit that detects the steering torque of a steering system and outputs a corresponding steering torque signal, a steering angle detection unit that detects the steering angle of the steering system and outputs a corresponding steering angle signal, a steering rotational speed detection unit that detects the steering rotational speed of the steering system and outputs a corresponding steering rotational speed signal, and a disturbance steering determination unit that determines a disturbance steering state (i.e., the steering system is under the influence of a disturbance) when the direction of the steering angle signal coincides with the direction of the steering rotational speed signal, and when the direction of the steering torque signal does not coincide with the direction of the steering angle signal or the direction of the steering rotational speed signal (see, for example, a first patent document: Japanese patent application laid-open No. H8-268309).

In addition, another known electric power steering apparatus is provided with a calculation unit that calculates a steering angle change vs steering torque change ratio which is the ratio of an amount of change of a steering torque obtained by a steering torque change amount calculation unit to an amount of change of a steering angle obtained by a steering angle change amount calculation unit, and a disturbance occurrence determination unit which determines that a disturbance to the vehicle has occurred, at the time when the steering angle change vs steering torque change ratio thus obtained is equal to or more than a predetermined value (see, for instance, a second patent document: Japanese patent application laid-open No. 2002-264832).

Also, a further known vehicular steering apparatus is provided with a behavior state detection unit that includes at least one of a yaw rate sensor and a lateral acceleration sensor, and detects the behavior of a vehicle in accordance with the value of a yaw rate or a lateral acceleration detected by the yaw rate sensor or the lateral acceleration sensor (see, for example, a third patent document: Japanese patent application laid-open No. 2000-25630).

In the known electric power steering apparatuses as described in the above-mentioned first and second patent documents, the occurrence of a disturbance to the vehicle is detected based on the sign of the steering torque and the amount of change of the steering torque. However, the steering torque contains friction torque generated in the steering system, so there has been a problem that the occurrence of a disturbance is not able to be detected in an accurate manner in a region in which the steering torque is limited.

In addition, in the known the vehicular steering apparatuses as disclosed in the above-mentioned third patent document, in order to detect the occurrence of a disturbance (the behavior of a vehicle), the yaw rate sensor for detecting the yaw rate or the lateral acceleration sensor for detecting a lateral acceleration is required. However, among vehicles of which the behaviors are disturbed by the occurrence of a disturbance, there are a lot of light cars and compact cars with short wheel bases, so there has been a problem that it is difficult to add either one of the sensors from the point of view of the cost. Further, there has also been a problem that the construction of the apparatus becomes complicated due to the addition of such a sensor.

SUMMARY OF THE INVENTION

Accordingly, the present invention is intended to obviate the problems as referred to above, and has for its object to provide a vehicular steering apparatus which is capable of detecting a disturbance even in a range where steering torque is limited and of achieving a low cost and simple construction.

Bearing the above object in mind, according to one aspect of the present invention, there is provided a vehicular steering apparatus which includes: a road surface reaction torque detection unit that detects an actual road surface reaction torque which is received by a wheel of a vehicle from a road surface; a vehicle speed detection unit that detects a vehicle speed of the vehicle; an angle detection unit that detects a steering wheel angle of a steering wheel of the vehicle or a steered angle of the wheel; a target road surface reaction torque calculation unit that calculates a target road surface reaction torque based on the vehicle speed and an output of the angle detection unit; and a disturbance occurrence detection unit that detects an occurrence of a disturbance to the vehicle and outputs a disturbance state signal. The disturbance occurrence detection unit includes a sign comparison unit that makes a comparison between signs of the actual road surface reaction torque and the target road surface reaction torque.

According to another aspect of the present invention, there is provided a vehicular steering apparatus which includes: a road surface reaction torque detection unit that detects an actual road surface reaction torque which is received by a wheel of a vehicle from a road surface; an actual road surface reaction torque change rate calculation unit that calculates an actual road surface reaction torque change rate which is a time change rate of the actual road surface reaction torque; a vehicle speed detection unit that detects a vehicle speed of the vehicle; a motor speed detection unit that detects a motor speed of an assist motor which adds an assist torque to a steering torque generated by a driver of the vehicle; a target road surface reaction torque change rate calculation unit that calculates a target road surface reaction torque change rate based on the vehicle speed and the motor speed; and a disturbance occurrence detection unit that detects an occurrence of a disturbance to the vehicle and outputs a disturbance state signal. The disturbance occurrence detection unit includes a sign comparison unit that makes a comparison between signs of the actual road surface reaction torque change rate and the target road surface reaction torque change rate.

According to a vehicular steering apparatus of the present invention, a disturbance detection unit includes a sign comparison unit, and detects the occurrence of a disturbance to a vehicle by making a comparison between the sign of an actual road surface reaction torque containing no friction torque therein and the sign of a target road surface reaction torque.

Thus, it is possible to detect the occurrence of the disturbance in an accurate manner even in a range where steering torque is limited, and at the same time to achieve a low cost and simple construction.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. Throughout respective figures, the same or corresponding members or parts are identified by the same reference numerals and characters.

Here, note that in the following embodiments, reference will be made to a case where a vehicular steering apparatus according to the present invention is installed on a motor vehicle.

Embodiment 1

Figure 1:
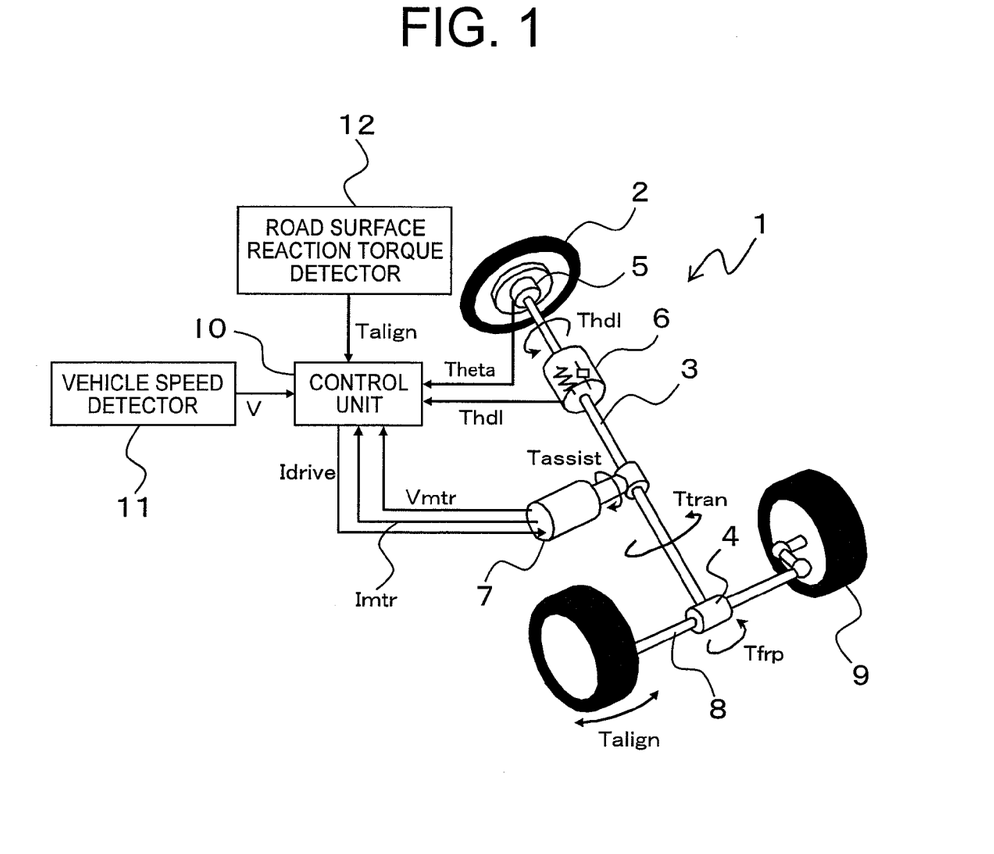
FIG. 1 is a block diagram showing a steering mechanism of a vehicular steering apparatus according to a first embodiment of the present invention.

Referring to the drawings and first to FIG. 1, there is shown, in a block diagram, a vehicular steering apparatus according to a first embodiment of the present invention.

In FIG. 1, a steering mechanism, generally designated at 1, includes a steering wheel 2, a steering column 3, a steering gearbox 4, a steering wheel angle detector 5 (an angle detection unit), a torque sensor 6 (a steering torque detection unit), an assist motor 7, a rack and pinion mechanism 8, tires 9 (road wheels), an EPS (Electric Power Steering) control unit 10 (hereinafter abbreviated as a "control unit 10"), a vehicle speed detector 11 (a vehicle speed detection unit), and a road surface reaction torque detector 12 (a road surface reaction torque detection unit).

Here, electric power is supplied from a power supply unit (not shown) to the steering mechanism 1.

In addition, the steering wheel angle detector 5, the torque sensor 6, the assist motor 7, the vehicle speed detector 11 and the road surface reaction torque detector 12 are electrically connected to the control unit 10 through cables.

The steering wheel 2, which is operated or steered by the driver of a motor vehicle, is connected with one end of the steering column 3. Also, the steering wheel angle detector 5 for detecting a steering wheel angle (rotational angle) Theta of the steering wheel 2 and outputting it to the control unit 10 is mounted on the steering wheel 2.

The torque sensor 6 for detecting a steering torque Thdl applied to the steering wheel 2 by the steering of the driver and outputting it to the control unit 10 is mounted on the steering column 3. In addition, the electrically operated assist motor 7 for generating an assist torque Tassist to assist the steering torque Thdl is mounted on the steering column 3 through a speed reduction gear (not shown).

The steering gearbox 4 for amplifying a combined torque obtained by adding the steering torque Thdl and the assist torque Tassist to each other by several times is coupled with the other end of the steering column 3.

In addition, the tires 9 are connected with the steering gearbox 4 through the rack and pinion mechanism 8.

The vehicle speed detector 11 detects a traveling speed (vehicle speed) V of the vehicle and outputs it to the control unit 10. Also, the road surface reaction torque detector 12 detects an actual road surface reaction torque Talign received by the tires 9 from a road surface and outputs it to the control unit 10.

The steering wheel angle Theta, the steering torque Thdl, the vehicle speed V, the actual road surface reaction torque Talign, a detected motor current Imtr of the assist motor 7 and a detected motor voltage Vmtr of the assist motor 7 are input to the control unit 10.

In addition, the control unit 10 calculates a target current value for making the assist motor 7 generate the assist torque Tassist based on the input of the above inputs thereto, and outputs a motor drive current Idrive to the assist motor 7.

Here, a steering column reaction torque Ttran generated in the steering column 3 is the road surface reaction torque converted into a corresponding torque applied to the steering column 3, and is a value which is obtained by adding the actual road surface reaction torque Talign to a total friction torque Tfric (not shown) that is a friction torque generated in the entire steering mechanism 1 (including the assist motor 7).

That is, the steering column reaction torque Ttran is represented by the following expression (1).

$$Ttran = Talign + Tfric \quad (1)$$

Moreover, the total friction torque Tfric is obtained by adding a value which is equal to the motor friction torque Tmfric in the form of a friction torque generated only in the assist motor 7, multiplied by a gear ratio Ggear of the speed reduction gear between the assist motor 7 and the steering column 3, to a column friction torque Tfrp in the form of a friction torque generated in the steering mechanism 1 without taking account of the assist motor 7.

The relation of these friction torques is represented by the following expression (2).

$$Tfric = Tmfric \cdot Ggear + Tfrp \quad (2)$$

This vehicular steering apparatus has a main function of detecting the steering torque Thdl generated when the driver steers the steering wheel 2 by means of the torque sensor 6, and generating the assist torque Tassist corresponding to the steering torque Thdl.

In addition, in a dynamic sense, the sum of the steering torque Thdl and the assist torque Tassist acts to rotate the steering column 3 against the steering column reaction torque Ttran. Also, when the steering wheel 2 is steered, an inertia torque generated by the inertia of the assist motor 7 also acts on the steering column 3.

Accordingly, when the inertia torque of the assist motor 7 is represented by $J \cdot d\omega/dt$, the steering column reaction torque Ttran is represented by the following expression (3).

$$Ttran = Thdl + Tassist - J \cdot d\omega/dt \quad (3)$$

Moreover, when the torque constant of the assist motor 7 is represented by Kt, the assist torque Tassist due to the assist motor 7 is represented by the following expression (4) by using the gear ratio Ggear of the above-mentioned speed reduction gear and the detected motor current Imtr.

$$Tassist = Ggear \cdot Kt \cdot Imtr \quad (4)$$

Further, the steering column reaction torque Ttran is represented by the following expression (5) by deforming the above-mentioned expression (1) using the above-mentioned expression (2).

$$Ttran = Talign + (Tmfric \cdot Ggear + Tfrp) \quad (5)$$

The control unit 10 controls the current to be supplied to the assist motor 7 so as to make the calculated target current value and the detected motor current Imtr coincide with each other, and outputs the motor drive current Idrive.

The assist motor 7 generates the assist torque Tassist which is obtained by multiplying the detected motor current Imtr by the torque constant Kt and the gear ratio Ggear of the speed reduction gear, as shown by the above-mentioned expression (4), whereby the steering torque Thdl due to the driver is assisted.

Figure 2:
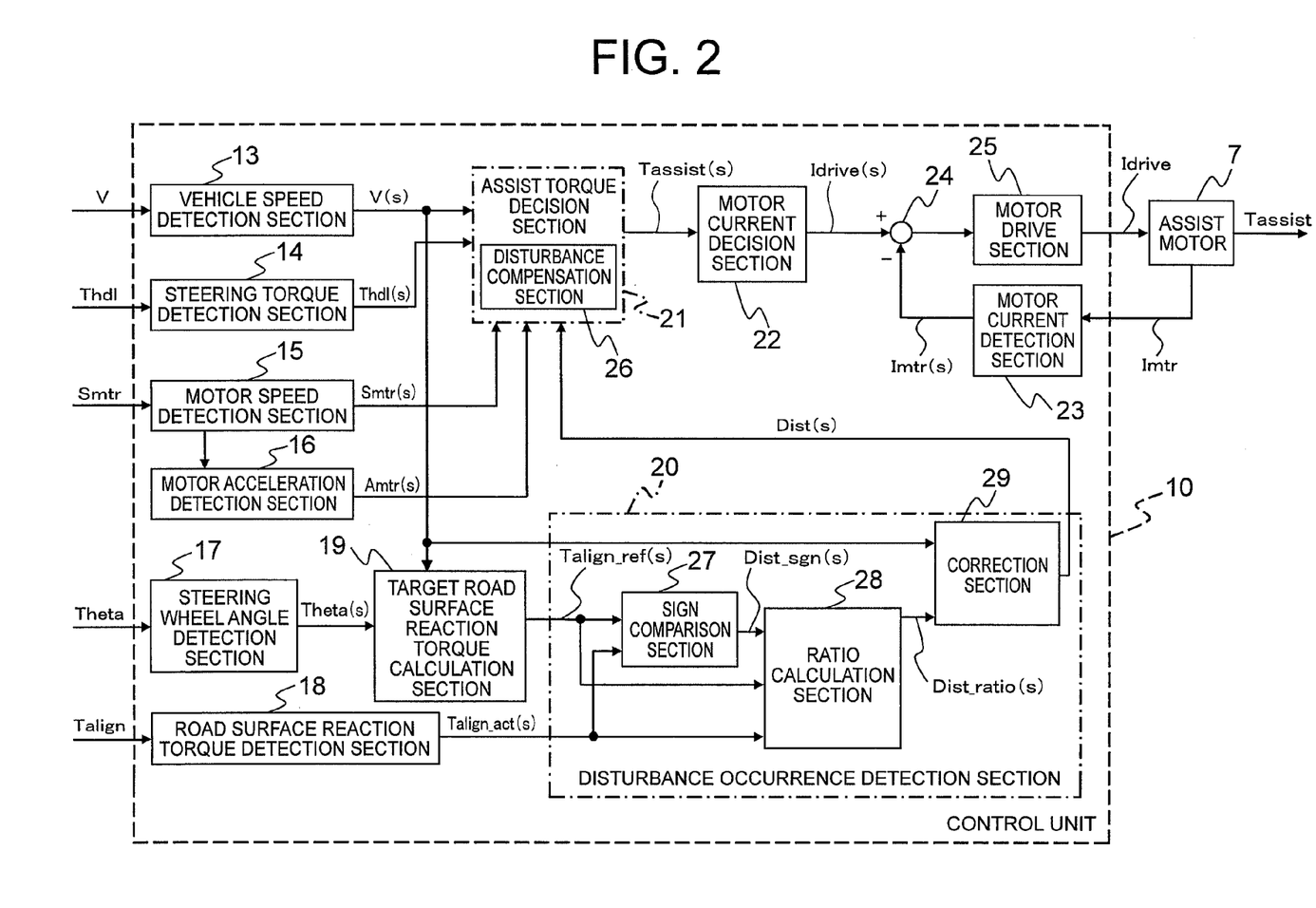
FIG. 2 is a block diagram showing a control unit of FIG. 1 together with an assist motor.

FIG. 2 is a block diagram that shows the control unit 10 of FIG. 1 together with the assist motor 7.

In FIG. 2, the control unit 10 includes a vehicle speed detection section 13, a steering torque detection section 14, a motor speed detection section 15, a motor acceleration detection section 16, a steering wheel angle detection section 17, a road surface reaction torque detection section 18, a target road surface reaction torque calculation section 19 (a target road surface reaction torque calculation unit), a disturbance occurrence detection section 20 (a disturbance occurrence detection unit), an assist torque decision section 21 (an assist torque decision unit), a motor current decision section 22, a motor current detection section 23, a comparison section 24, and a motor drive section 25.

Here, note that the control unit 10 is composed of a microprocessor (not shown) including a CPU and a memory with programs stored therein, and individual blocks constituting the control unit 10 are stored in the memory as software.

The vehicle speed detection section 13 receives the vehicle speed V output from the vehicle speed detector 11, and outputs a vehicle speed signal V(s). The steering torque detection section 14 receives the steering torque Thdl output from the torque sensor 6, and outputs a steering torque signal Thdl(s).

The motor speed detection section 15 receives a motor speed (rotational speed) Smtr output from a rotational speed sensor (not shown) mounted on the assist motor 7, and outputs a motor speed signal Smtr(s). The motor acceleration detection section 16 differentiates the motor speed signal Smtr(s) and outputs a motor acceleration signal Amtr(s).

Here, note that the motor speed detection section 15 may output the motor speed signal Smtr(s) based on a detected motor current signal Imtr(s) output from the motor current detection section 23 and a detected motor voltage signal Vmtr(s) output from a motor voltage detection section (not shown).

The steering wheel angle detection section 17 receives the steering wheel angle Theta output from the steering wheel angle detector 5, and outputs a steering wheel angle signal Theta(s). The road surface reaction torque detection section 18 receives the actual road surface reaction torque Talign output from the road surface reaction torque detector 12, and outputs an actual road surface reaction torque signal Talign_act(s).

The road surface reaction torque detector 12 for detecting the actual road surface reaction torque Talign is, for example, in the form of a load cell (not shown) mounted on a tire 9, and outputs an amount of deformation of a strain gauge mounted on the load cell as the actual road surface reaction torque Talign.

The target road surface reaction torque calculation section 19 has a vehicle speed and steering wheel angle-target road surface reaction torque map in which a relation among the vehicle speed V, the steering wheel angle Theta and a target road surface reaction torque Talign_ref is described.

The target road surface reaction torque calculation section 19 calculates a target road surface reaction torque signal Talign_ref(s) from the above map based on the vehicle speed signal V(s) from the vehicle speed detection section 13 and the steering wheel angle signal Theta(s) from the steering wheel angle detection section 17.

The disturbance occurrence detection section 20 detects the presence or absence of the occurrence of a disturbance to a vehicle based on the actual road surface reaction torque signal Talign_act(s) and the target road surface reaction torque signal Talign_ref(s), and outputs a disturbance state signal Dist(s).

The vehicle speed signal V(s), the steering torque signal Thdl(s), the motor speed signal Smtr(s), the motor acceleration signal Amtr(s) and the disturbance state signal Dist(s) are input to the assist torque decision section 21.

The assist torque decision section 21 decides the assist torque Tassist based on these input signals, and outputs an assist torque signal Tassist(s) for making the assist motor 7 generate the assist torque Tassist.

In addition, the assist torque decision section 21 includes a disturbance compensation section 26 (a disturbance compensation unit) that calculates a disturbance compensation torque for compensating for the assist torque Tassist based on the disturbance state signal Dist(s).

Here, the vehicular steering apparatus according to this embodiment is featured in that the disturbance occurrence detection section 20 detects the occurrence of a disturbance to the vehicle, and outputs the disturbance state signal Dist(s), and the assist torque decision section 21 then outputs the assist torque signal Tassist(s) based on the disturbance state signal Dist(s). As a result, input signals to the assist torque decision section 21 are shown as limited.

However, the actual assist torque decision section 21 can decide the assist torque Tassist by using various signals besides these signals. The vehicular steering apparatus according to this embodiment can also be applied to any kind of vehicular steering apparatus.

The motor current decision section 22 calculates the target current value for making the assist motor 7 generate the assist torque Tassist based on the assist torque signal Tassist(s), and outputs a target current signal Idrive(s).

The motor current detection section 23 receives the detected motor current Imtr flowing through the assist motor 7, and outputs the detected motor current signal Imtr(s). The comparison section 24 outputs a deviation between the target current signal Idrive(s) and the detected motor current signal Imtr(s).

The motor drive section 25 outputs the motor drive current Idrive so as to make the deviation between the target current signal Idrive(s) and the detected motor current signal Imtr(s) zero.

The disturbance occurrence detection section 20 includes a sign comparison section 27 (a sign comparison unit), a ratio calculation section 28 (a ratio calculation unit) and a correction section 29 (a correction unit).

The sign comparison section 27 compares the sign of the actual road surface reaction torque signal Talign_act(s) from the road surface reaction torque detection section 18 and the sign of the target road surface reaction torque signal Talign_ref(s) from the target road surface reaction torque calculation section 19, detects the presence or absence of the occurrence of a disturbance, and outputs a disturbance detection signal Dist_sgn(s).

Here, reference will be made to the principle of the sign comparison section 27 while referring to FIG. 3 and FIG. 4.

Figure 3:
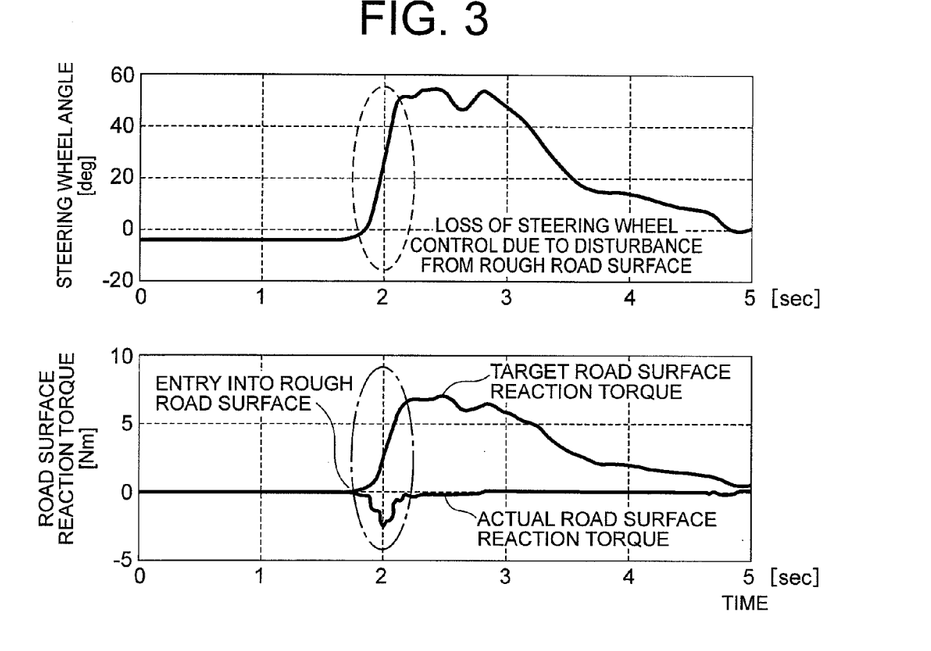
FIG. 3 is an explanatory view illustrating the relation between time, a steering wheel angle and a road surface reaction torque at the time when a disturbance occurs in a vehicle that is driving straight ahead with hands off a steering wheel.

FIG. 3 is an explanatory view that illustrates the relation between time, the steering wheel angle and the road surface reaction torque at the time when a disturbance occurs in the vehicle that is driving straight ahead with driver's hands off the steering wheel. Also, FIG. 4 is an explanatory view that illustrates the relation between time, the steering wheel angle and the road surface reaction torque at the time when a steering operation such as lane changing, etc., is performed in an ordinary road surface condition.

In FIG. 3, when the vehicle comes into a rough road surface, driver's control on the steering wheel 2 is lost by a disturbance from the rough road surface, and the steering wheel angle Theta is caused to change (see an elliptical mark of a broken line).

At this time, the sign (direction) of the actual road surface reaction torque Talign detected by the road surface reaction torque detector 12 is opposite to that (direction) of the target road surface reaction torque Talign_ref calculated from the above-mentioned vehicle speed and steering wheel angle-target road surface reaction torque map by using the steering wheel angle Theta (see an elliptical mark of an alternate long and short dash line).

Figure 4:
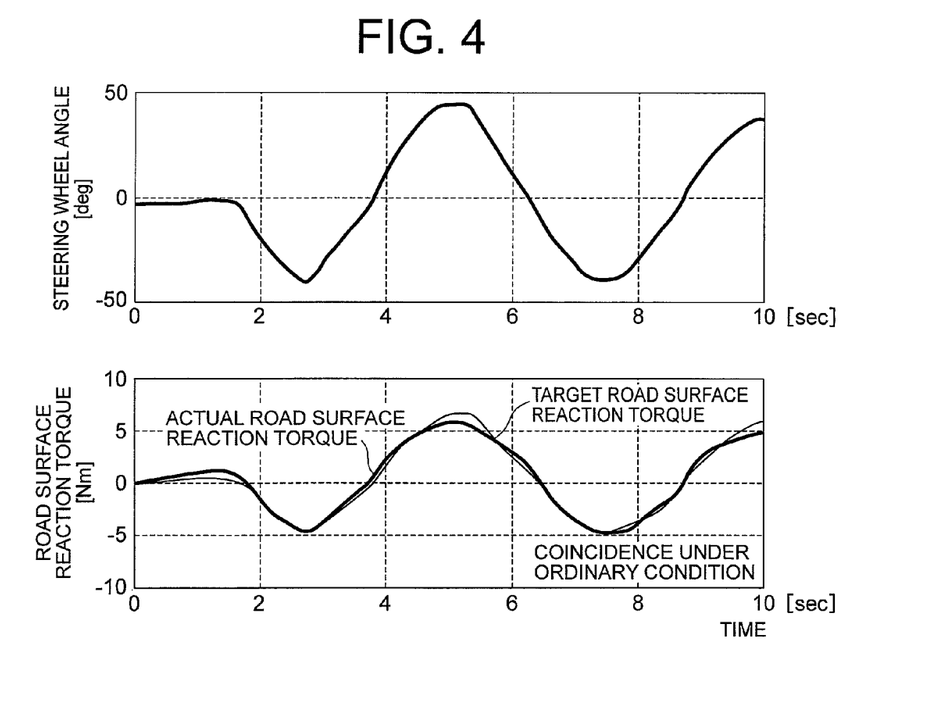
FIG. 4 is an explanatory view illustrating the relation between time, the steering wheel angle and the road surface reaction torque at the time when a steering operation such as lane changing, etc., is performed in an ordinary road surface condition.

On the other hand, in FIG. 4, when the steering wheel angle signal Theta is changed by driver's steering such as lane changing, etc., the sign of the actual road surface reaction torque Talign and the sign of the target road surface reaction torque Talign_ref coincide with each other.

Accordingly, the occurrence of a disturbance to the vehicle can be detected by making a comparison between the signs of the actual road surface reaction torque Talign and the target road surface reaction torque Talign_ref.

That is, when the signs of the actual road surface reaction torque signal Talign_act(s) and the target road surface reaction torque signal Talign_ref(s) do not coincide with each other, the sign comparison section 27 determines the occurrence of a disturbance, and accordingly outputs a disturbance detection signal Dist_sgn(s) of "1". On the contrary, when the signs of the actual road surface reaction torque signal Talign_act(s) and the target road surface reaction torque signal Talign_ref(s) coincide with each other, it is determined that no disturbance occurs (ordinary steering state), and a disturbance detection signal Dist_sgn(s) of "0" is accordingly output.

The ratio calculation section 28 calculates a ratio of the actual road surface reaction torque signal Talign_act(s) from the road surface reaction torque detection section 18 and the target road surface reaction torque signal Talign_ref(s) from the target road surface reaction torque calculation section 19, and outputs a disturbance torque ratio signal Dist_ratio(s) indicating the degree of occurrence of the disturbance (the state of the disturbance) together with the disturbance detection signal Dist_sgn(s) from the sign comparison section 27.

At this time, the influence of the disturbance to the vehicle varies according to the individual vehicle and the vehicle speed. Accordingly, it is necessary to correct the disturbance torque ratio signal Dist_ratio(s).

The correction section 29 has a vehicle speed-gain map in which a relation between the vehicle speed V and a gain for correcting the disturbance torque ratio signal Dist_ratio(s) is described. This vehicle speed-gain map is set in accordance with the individual vehicle.

The correction section 29 decides the gain from the above map based on the vehicle speed signal V(s) from the vehicle speed detection section 13, and outputs the disturbance state signal Dist(s) that is obtained by multiplying the disturbance torque ratio signal Dist_ratio(s) from the ratio calculation section 28 by the gain.

Hereinafter, reference will be made to the operations of the target road surface reaction torque calculation section 19 and the disturbance occurrence detection section 20 according to the first embodiment of the present invention while referring to a flow chart in FIG. 5 together with the block diagram of FIG. 2.

First of all, the control unit 10 takes or reads in the vehicle speed signal V(s) output from the vehicle speed detection section 13, the steering wheel angle signal Theta(s) output from the steering wheel angle detection section 17, and the actual road surface reaction torque signal Talign_act(s) output from the road surface reaction torque detection section 18, and stores them in the memory therein (step S51).

Subsequently, the target road surface reaction torque calculation section 19 calculates the target road surface reaction torque signal Talign_ref(s) from the above-mentioned vehicle speed and steering wheel angle-target road surface reaction torque map based on the vehicle speed signal V(s) and the steering wheel angle signal Theta(s), and stores it in the memory (step S52).

Then, the sign comparison section 27 calculates the disturbance detection signal Dist_sgn(s) by comparing the sign of the actual road surface reaction torque signal Talign_act(s) and the sign of the target road surface reaction torque signal Talign_ref(s) with each other, and stores it in the memory (step S53).

That is, when the signs of the actual road surface reaction torque signal Talign_act(s) and the target road surface reaction torque signal Talign_ref(s) do not coincide with each other, the disturbance detection signal Dist_sgn(s) is stored as "1" in the memory, whereas when the these signs coincide with each other, the disturbance detection signal Dist_sgn(s) is stored as "0" in the memory.

Subsequently, the ratio calculation section 28 calculates the ratio of the actual road surface reaction torque signal Talign_act(s) and the target road surface reaction torque signal Talign_ref(s), also calculates the disturbance torque ratio signal Dist_ratio(s), and stores it in the memory together with the disturbance detection signal Dist_sgn(s) (step S54).

Thereafter, the correction section 29 decides the gain from the above-mentioned vehicle speed-gain map based on the vehicle speed signal V(s), calculates the disturbance state signal Dist(s) by multiplying the disturbance torque ratio signal Dist_ratio(s) by the gain, and stores it in the memory (step S55).

Figure 5:
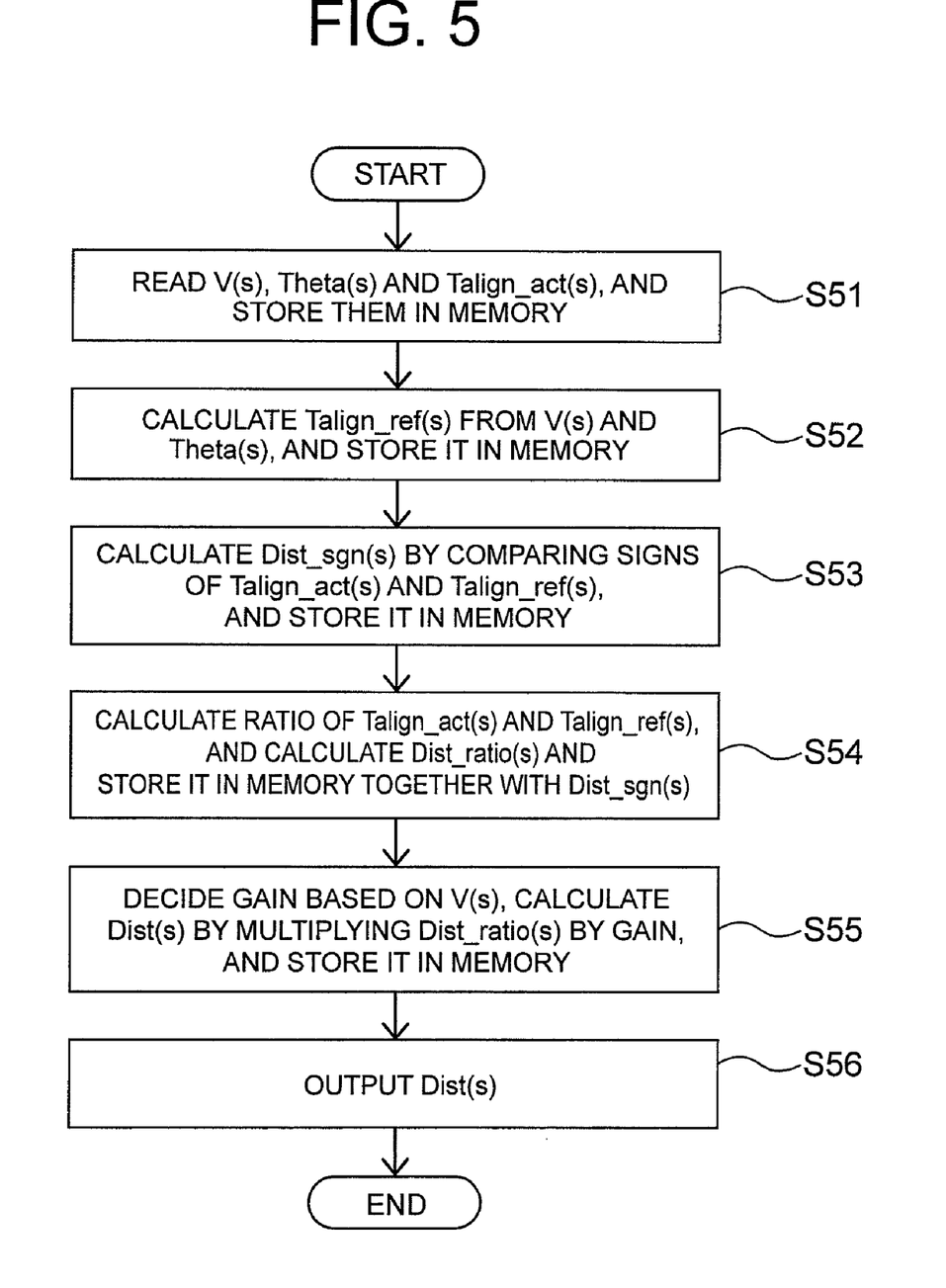
FIG. 5 is a flow chart illustrating the operations of a target road surface reaction torque calculation unit and a disturbance occurrence detection unit according to the first embodiment of the present invention.

Subsequently, the correction section 29 outputs the disturbance state signal Dist(s) (step S56), and the processing of FIG. 5 is terminated.

According to the vehicular steering apparatus of the first embodiment of the present invention, the sign comparison section 27 included in the disturbance occurrence detection section 20 detects the presence or absence of the occurrence of a disturbance by comparing the signs of the actual road surface reaction torque signal Talign_act(s) and the target road surface reaction torque signal Talign_ref(s) with each other, and outputs a disturbance detection signal Dist_sgn(s).

Here, note that the actual road surface reaction torque Talign which is received by each tire 9 from the road surface does not contain any friction torque, unlike the steering column reaction torque Ttran.

Thus, it is possible to detect the occurrence of a disturbance in an accurate manner even in a range where the steering torque Thdl is limited. In addition, stabilization control on the vehicle can be performed from a region in which the degree of occurrence of a disturbance is small, so it is possible to prevent an uncomfortable feeling from being given to the driver upon intervention of the control.

In addition, neither a yaw rate sensor nor a lateral acceleration sensor is needed, so a low cost and simple construction of the vehicular steering apparatus can be achieved.

Also, the occurrence of a disturbance is detected based on the actual road surface reaction torque Talign generated in the individual tires 9, so it is possible to detect the occurrence of the disturbance in an accurate manner even when the vehicle is traveling on a slippery road surface such as a snow road.

Moreover, the ratio calculation section 28 included in the disturbance occurrence detection section 20 calculates the ratio of the actual road surface reaction torque signal Talign_act(s) and the target road surface reaction torque signal Talign_ref(s), and outputs the disturbance torque ratio signal Dist_ratio(s) indicating the degree of occurrence of a disturbance together with the disturbance detection signal Dist_sgn(s).

As a result, the degree of occurrence of a disturbance can be calculated in an accurate manner, and the stabilization control of the vehicle can be performed in an appropriate manner.

Further, the correction section 29 included in the disturbance occurrence detection section 20 decides the gain for correcting the disturbance torque ratio signal Dist_ratio(s) based on the vehicle speed signal V(s), and outputs the disturbance state signal Dist(s) that is obtained by multiplying the disturbance torque ratio signal Dist_ratio(s) by the gain. Also, the disturbance compensation section 26 included in the assist torque decision section 21 calculates the disturbance compensation torque for compensating for the assist torque Tassist based on the disturbance state signal Dist(s).

Thus, it is possible to perform the stabilization control of the vehicle more appropriately in accordance with the vehicle speed V.

Here, note that the disturbance occurrence detection section 20 of the above-mentioned first embodiment includes the ratio calculation section 28, which calculates the degree of occurrence of a disturbance by calculating the ratio of the actual road surface reaction torque signal Talign_act(s) and the target road surface reaction torque signal Talign_ref(s).

However, the present invention is not limited to this, and the disturbance occurrence detection section 20 may include, instead of the ratio calculation section 28, a deviation calculation section (a deviation calculation unit) that calculates a deviation between the actual road surface reaction torque signal Talign_act(s) and the target road surface reaction torque signal Taligri_ref(s), and outputs a disturbance torque deviation signal Dist_dev(s) indicating the degree of occurrence of a disturbance together with the disturbance detection signal Dist_sgn(s).

In this case, too, the operational or advantageous effects similar to those of the above-mentioned first embodiment can be achieved.

In addition, the disturbance occurrence detection section 20 may include only the sign comparison section 27 in order to output the disturbance state signal Dist(s) by detecting the presence or absence of the occurrence of a disturbance in a more simple manner.

Also, the disturbance occurrence detection section 20 may detect the occurrence of a disturbance to the vehicle when the ratio or deviation between the actual road surface reaction torque signal Talign_act(s) and the target road surface reaction torque signal Talign_ref(s) exceeds a predetermined threshold which is set in accordance with the individual vehicle.

In these cases, the construction of the apparatus can be further simplified.

Embodiment 2

Figure 6:
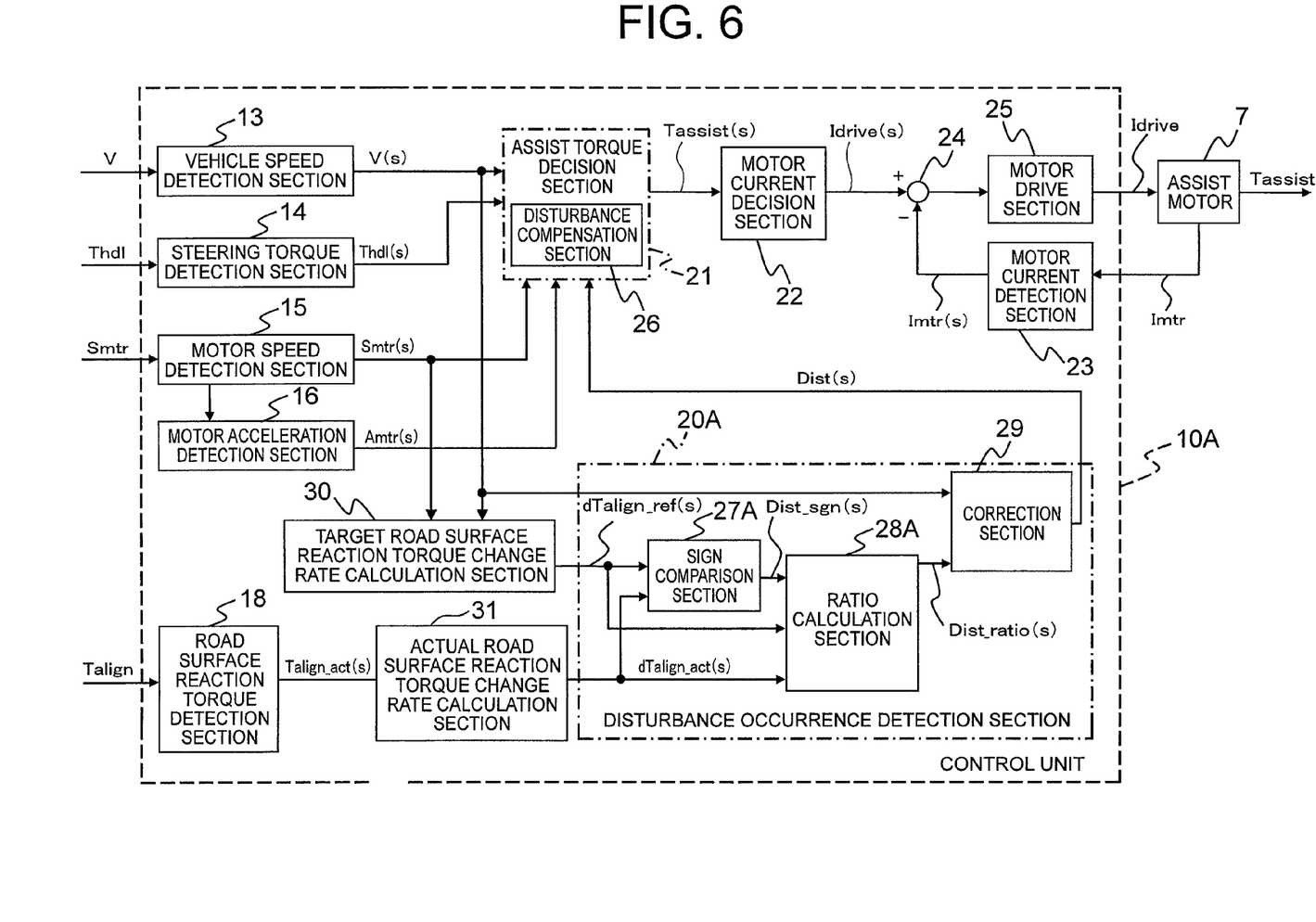
FIG. 6 is a block diagram schematically illustrating a control unit of a vehicular steering apparatus with an assist motor according to a second embodiment of the present invention.

FIG. 6 is a block diagram that schematically illustrates a control unit 10A together with an assist motor 7 in a vehicular steering apparatus according to a second embodiment of the present invention.

In FIG. 6, the control unit 10A is provided with an actual road surface reaction torque change rate calculation section 31 (an actual road surface reaction torque change rate calculation unit) that calculates an actual road surface reaction torque change rate dTalign_act in the form of a time change rate of the actual road surface reaction torque Talign.

In addition, the control unit 10A has a target road surface reaction torque change rate calculation section 30 (a target road surface reaction torque change rate calculation unit) and a disturbance occurrence detection section 20A, in place of the target road surface reaction torque calculation section 19 and the disturbance occurrence detection section 20 shown in FIG. 2.

The target road surface reaction torque change rate calculation section 30 has a vehicle speed and motor speed-target road surface reaction torque change rate map in which a relation among a vehicle speed V, a motor speed Smtr and a target road surface reaction torque change rate dTalign_ref is described.

The target road surface reaction torque change rate calculation section 30 calculates a target road surface reaction torque change rate signal dTalign_ref(s) from the above-mentioned vehicle speed and motor speed-target road surface reaction torque change rate map based on the vehicle speed signal V(s) from the vehicle speed detection section 13 and the motor speed signal Smtr(s) from the motor speed detection section 15.

The disturbance occurrence detection section 20A detects the presence or absence of the occurrence of a disturbance to a vehicle based on an actual road surface reaction torque change rate signal dTalign_act(s) and the target road surface reaction torque change rate signal dTalign_ref(s), and outputs a disturbance state signal Dist(s), The disturbance occurrence detection section 20A includes a sign comparison section 27A (a sign comparison unit), a ratio calculation section 28A (a ratio calculation unit) and a correction section 29 (a correction unit).

The sign comparison section 27A compares the sign of the actual road surface reaction torque change rate signal dTalign_act(s) from the road surface reaction torque change rate calculation section 31 and the sign of the target road surface reaction torque change rate signal dTalign_ref(s) from the target road surface reaction torque change rate calculation section 30, detects the presence or absence of the occurrence of a disturbance, and outputs a disturbance detection signal Dist_sgn(s).

Here, reference will be made to the principle of the sign comparison section 27A while referring to FIG. 7.

Figure 7:
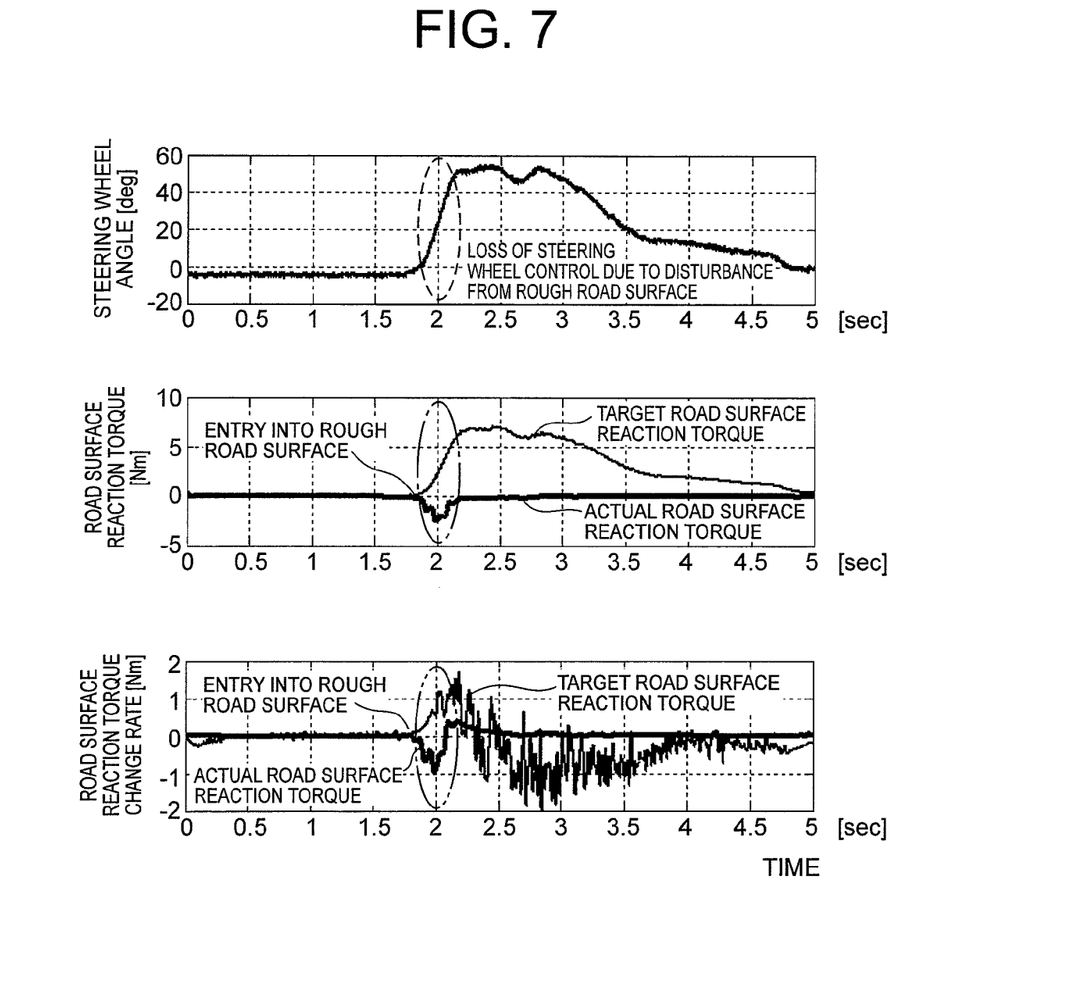
FIG. 7 is an explanatory view illustrating the relation between time, a steering wheel angle, a road surface reaction torque and a road surface reaction torque change rate at the time when a disturbance occurs in a vehicle that is running straight ahead with hands off a steering wheel.

FIG. 7 is an explanatory view that illustrates a relation between time, a steering wheel angle, the road surface reaction torque and the road surface reaction torque change rate at the time when a disturbance occurs in the vehicle that is running straight ahead with driver's hands off the steering wheel 2 (see FIG. 1).

In FIG. 7, when the vehicle comes into a rough road surface, driver's control on the steering wheel 2 is lost by a disturbance from the rough road surface, and the steering wheel angle Theta is caused to change (see an elliptical mark of a broken line).

At this time, the sign (direction) of the actual road surface reaction torque Talign detected by the road surface reaction torque detector 12 is opposite to that (direction) of the target road surface reaction torque Talign_ref calculated from the above-mentioned vehicle speed and steering wheel angle-target road surface reaction torque map by using the steering wheel angle Theta (see an elliptical mark of an alternate long and short dash line).

At this time, the sign (direction) of the actual road surface reaction torque change rate dTalign_act calculated by the actual road surface reaction torque change rate calculation section 31 is opposite to that (direction) of the target road surface reaction torque change rate dTalign_ref calculated by the target road surface reaction torque change rate calculation section 30 (see an elliptical mark of an alternate long and two short dashes line).

Accordingly, the occurrence of a disturbance to the vehicle can be detected by making a comparison between the signs of the actual road surface reaction torque change rate dTalign_act and the target road surface reaction torque change rate dTalign_ref.

That is, when the signs of the actual road surface reaction torque change rate signal dTalign_act(s) and the target road surface reaction torque change rate signal dTalign_ref(s) do not coincide with each other, the sign comparison section 27A determines the occurrence of a disturbance, and accordingly outputs a disturbance detection signal Dist_sgn(s) of "1". On the contrary, when the signs of the actual road surface reaction torque change rate signal dTalign_act(s) and the target road surface reaction torque change rate signal dTalign_ref(s) coincide with each other, it is determined that no disturbance occurs (ordinary steering state), and a disturbance detection signal Dist_Sgn(s) of "0" is accordingly output.

The ratio calculation section 28A calculates the ratio of the actual road surface reaction torque change rate signal dTalign_act(s) from the actual road surface reaction torque change rate calculation section 31 and the target road surface reaction torque change rate signal Talign_ref(s) from the target road surface reaction torque change rate calculation section 30, and outputs a disturbance torque ratio signal Dist_ratio(s) indicating the degree of occurrence of the disturbance (the state of the disturbance) together with the disturbance detection signal Dist_sgn(s) from the sign comparison section 27A.

The correction section 29 decides a gain from the above-mentioned vehicle speed-gain map based on the vehicle speed signal V(s) from the vehicle speed detection section 13, and outputs a disturbance state signal Dist(s) that is obtained by multiplying the disturbance torque ratio signal Dist_ratio(s) from the ratio calculation section 28A by the gain.

The construction of this second embodiment other than the above is similar to that of the first embodiment, and a description thereof is omitted.

Hereinafter, reference will be made to the operations of the target road surface reaction torque change rate calculation section 30, the actual road surface reaction torque change rate calculation section 31 and the disturbance occurrence detection section 20A according to the second embodiment of the present invention while referring to a flow chart in FIG. 8 together with the block diagram of FIG. 6.

First of all, the vehicle speed signal V(s) output from the vehicle speed detection section 13, the motor speed signal Smtr(s) output from the motor speed detection section 15, and the actual road surface reaction torque signal Talign_act(s) output from the road surface reaction torque detection section 18 are read out and stored in the memory of the control unit 10A (step S61).

Subsequently, the target road surface reaction torque change rate calculation section 30 calculates the target road surface reaction torque change rate signal dTalign_ref(s) from the above-mentioned vehicle speed and motor speed-target road surface reaction torque change rate map based on the vehicle speed signal V(s) and the motor speed signal Smtr(s), and stores it in the memory (step S62).

Next, the actual road surface reaction torque change rate calculation section 31 calculates the actual road surface reaction torque change rate signal dTalign_act(s) based on the actual road surface reaction torque signal Talign_act(s), and stores it in the memory (step S63).

Then, the sign comparison section 27 calculates the disturbance detection signal Dist_sgn(s) by comparing the sign of the actual road surface reaction torque change rate signal dTalign_act(s) and the sign of the target road surface reaction torque change rate signal dTalign_ref(s) with each other, and stores it in the memory (step S64).

That is, when the signs of the actual road surface reaction torque change rate signal dTalign_act(s) and the target road surface reaction torque change rate signal dTalign_ref(s) do not coincide with each other, the disturbance detection signal Dist_sgn(s) is stored as "1" in the memory, whereas when the these signs coincide with each other, the disturbance detection signal Dist_sgn(s) is stored as "0" in the memory.

Subsequently, the ratio calculation section 28A calculates the ratio of the actual road surface reaction torque change rate signal dTalign_act(s) and the target road surface reaction torque change rate signal dTalign_ref(s), also calculates the disturbance torque ratio signal Dist_ratio(s), and stores it in the memory together with the disturbance detection signal Dist_sgn(s) (step S65).

Thereafter, the correction section 29 decides a gain from the above-mentioned vehicle speed-gain map based on the vehicle speed signal V(s), calculates the disturbance state signal Dist(s) by multiplying the disturbance torque ratio signal Dist_ratio(s) by the gain, and stores it in the memory (step S66).

Figure 8:
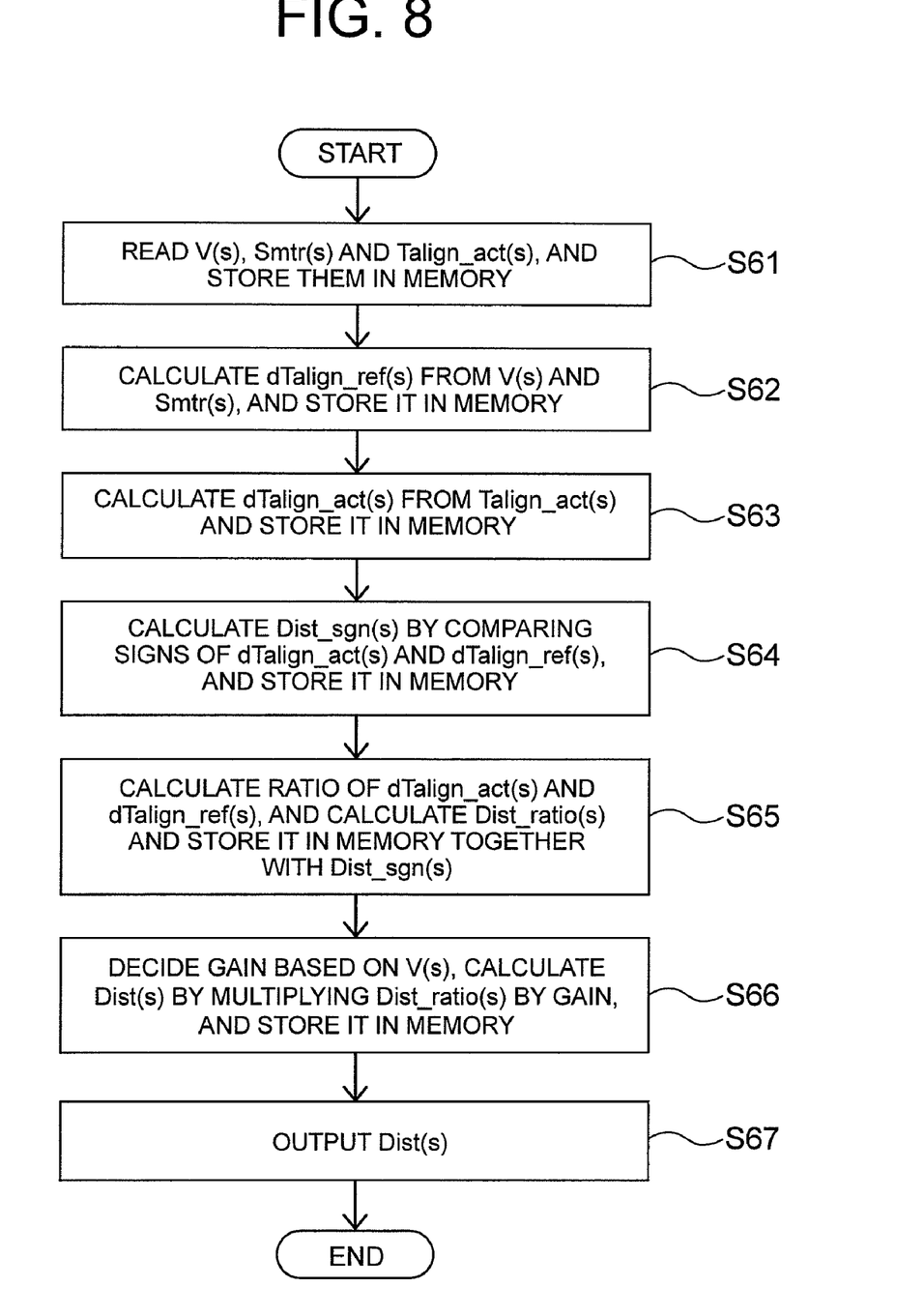
FIG. 8 is a flow chart illustrating the operations of a target road surface reaction torque change rate calculation unit, an actual road surface reaction torque change rate calculation unit and a disturbance occurrence detection unit according to the second embodiment of the present invention.

Subsequently, the correction section 29 outputs the disturbance state signal Dist(s) (step S67), and the processing of FIG. 8 is terminated.

According to the vehicular steering apparatus according to the second embodiment of the present invention, the sign comparison section 27A included in the disturbance occurrence detection section 20A compares the sign of the actual road surface reaction torque change rate signal dTalign_act(s) calculated from the actual road surface reaction torque signal Talign_act(s) and the sign of the target road surface reaction torque change rate signal dTalign_ref(s), detects the presence or absence of the occurrence of a disturbance, and outputs a disturbance detection signal Dist_sgn(s).

Here, note that the actual road surface reaction torque Talign which is received by each tire 9 from the road surface does not contain any friction torque, unlike the steering column reaction torque Ttran.

Thus, it is possible to detect the occurrence of a disturbance in an accurate manner even in a range where the steering torque Thdl is limited. In addition, stabilization control on the vehicle can be performed from a region in which the degree of occurrence of a disturbance is small, so it is possible to prevent an uncomfortable feeling from being given to the driver upon intervention of the control.

In addition, neither a yaw rate sensor nor a lateral acceleration sensor is needed, so a low cost and simple construction of the vehicular steering apparatus can be achieved.

Also, the steering wheel angle detector 5 for detecting the steering wheel angle Theta of the steering wheel 2 and outputting it to the control unit 10A as required in the first embodiment becomes unnecessary, so the construction of the apparatus can be further simplified.

Moreover, the occurrence of a disturbance can be detected at an earlier stage by using the rate of change of the road surface reaction torque, whereby the stabilization control of the vehicle can be performed at an earlier stage.

Further, the ratio calculation section 28A included in the disturbance occurrence detection section 20A calculates the ratio of the actual road surface reaction torque change rate signal dTalign_act(s) and the target road surface reaction torque change rate signal dTalign_ref(s), and outputs the disturbance torque ratio signal Dist_ratio(s) indicating the degree of occurrence of a disturbance together with the disturbance detection signal Dist_sgn(s).

Accordingly, the degree of occurrence of a disturbance can be calculated in an accurate manner, as a consequence of which the stabilization control of the vehicle can be performed in an appropriate manner.

Here, note that the disturbance occurrence detection section 20A of the above-mentioned second embodiment includes the ratio calculation section 28A, which calculates the degree of occurrence of a disturbance by calculating the ratio of the actual road surface reaction torque change rate signal dTalign_act(s) and the target road surface reaction torque change rate signal dTalign_ref(s).

However, the present invention is not limited to this, and the disturbance occurrence detection section 20A may include, instead of the ratio calculation section 28A, a deviation calculation section (a deviation calculation unit) that calculates a deviation between the actual road surface reaction torque change rate signal dTalign_act(s) and the target road surface reaction torque change rate signal dTalign_ref(s), and outputs a disturbance torque deviation signal Dist_dev(s) indicating the degree of occurrence of a disturbance together with the disturbance detection signal Dist_sgn(s).

In this case, too, the advantageous effects similar to those of the above-mentioned second embodiment can be achieved.

In addition, the disturbance occurrence detection section 20A may include only the sign comparison section 27A in order to output the disturbance state signal Dist(s) by detecting the presence or absence of the occurrence of a disturbance in a more simple manner.

Also, the disturbance occurrence detection section 20A may detect the occurrence of a disturbance to the vehicle when the ratio or deviation between the actual road surface reaction torque change rate signal dTalign_act(s) and the target road surface reaction torque change rate signal dTalign_ ref(s) exceeds a predetermined threshold which is set in accordance with the individual vehicle.

In these cases, the construction of the apparatus can be further simplified.

Moreover, the disturbance occurrence detection section 20A may calculate the degree of occurrence of a disturbance by combining the actual road surface reaction torque signal Talign_act(s) and the target road surface reaction torque signal Talign_ref(s), as well as the actual road surface reaction torque change rate signal dTalign_act(s) and the target road surface reaction torque change rate signal dTalign_ref(s).

At this time, the control unit 10A includes the steering wheel angle detection section 17 and the target road surface reaction torque calculation section 19 shown in the above-mentioned first embodiment.

In this case, too, the advantageous effects similar to those of the above-mentioned second embodiment can be achieved.

Embodiment 3

In the above-mentioned first and second embodiments, the steering wheel 2 and the tires 9 are connected to each other by means of a link mechanism, so when a disturbance occurs, the driver needs to steer the steering wheel 2 though the steering torque required is reduced.

Accordingly, it is desirable that the steered angle of the tires 9 be changed independently of the steering angle of the steering wheel 2.

Figure 9:
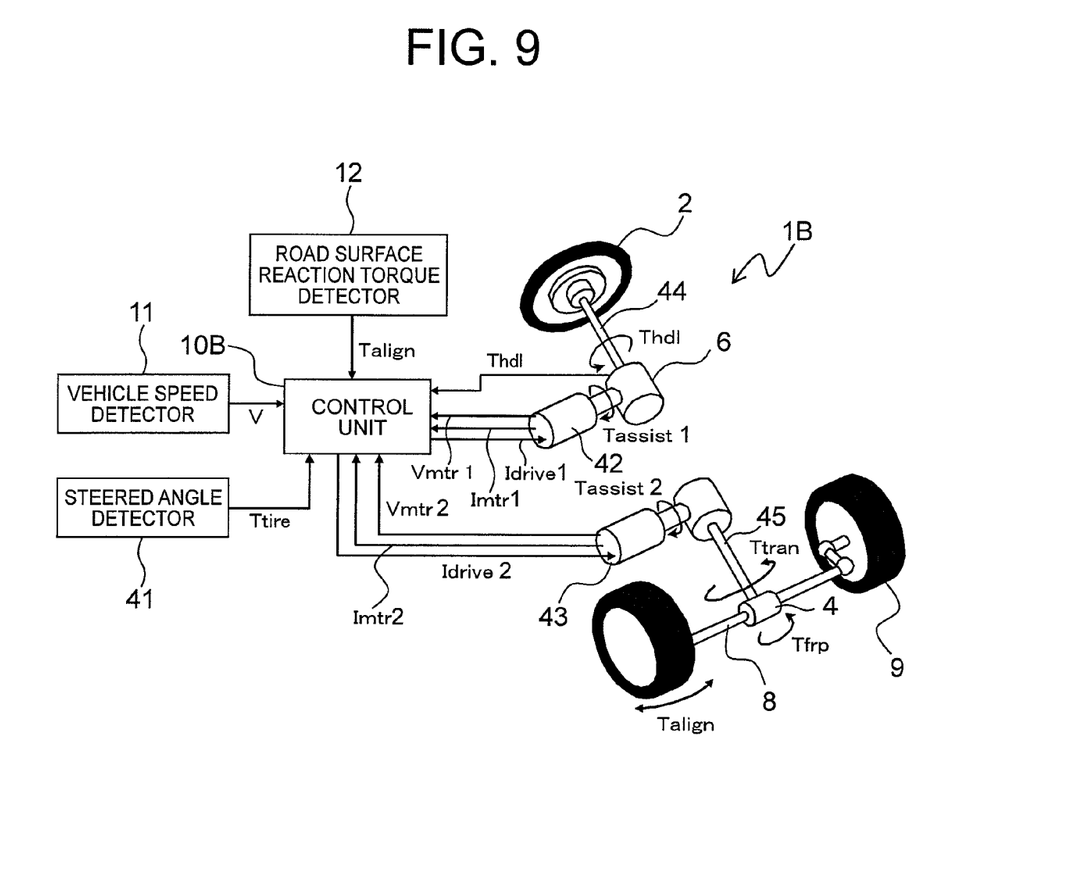
FIG. 9 is a block diagram showing a steering mechanism of a vehicular steering apparatus according to a third embodiment of the present invention.

FIG. 9 is a block diagram that shows a steering mechanism 1B (a front wheel steering mechanism) of a vehicular steering apparatus according to a third embodiment of the present invention.

In FIG. 9, the steering mechanism 1B is provided with a steered angle detector 41 (an angle detection unit), a first assist motor 42, a second assist motor 43, and a control unit 10B (a front wheel steered angle control unit), in place of the steering wheel angle detector 5, the assist motor 7 and the control unit 10 shown in FIG. 1.

Here, note that the steering mechanism 1B constitutes a steer-by-wire mechanism that is able to change a steered angle Ttire of the tires 9 (here, front wheels) independently of the steering wheel angle Theta of the steering wheel 2.

The steered angle detector 41 detects the steered angle Ttire of the tires 9, and outputs it to the control unit 10B.

The first assist motor 42 is connected to a steering-wheel-side steering column 44, and controls a steering reaction force Tassist1 transmitted to the steering wheel 2. The second assist motor 43 is connected to a tire-side steering column 45, and controls the steered angle Ttire of the tires 9 by generates an assist torque Tassist 2 for assisting the steering torque Thdl.

The steering torque Thdl, a vehicle speed V detected by a vehicle speed detector 11, a actual road surface reaction torque Talign detected by a road surface reaction torque detector 12, the steered angle Ttire of the tires 9, a detected motor current Imtr1 of the first assist motor 42, a detected motor voltage Vmtr1 of the first assist motor 42, a detected motor current Imtr2 of the second assist motor 43, and a detected motor voltage Vmtr2 of the second assist motor 43 are input to the control unit 10B.

The control unit 10B calculates, based on the above inputs, target current values for generating the steering reaction force Tassist1 and the assist torque Tassist 2 in the first assist motor 42 and the second assist motor 43, respectively, and outputs a first motor drive current Idrive1 and a second motor drive current Idrive 2 to the first assist motor 42 and the second assist motor 43, respectively.

In addition, the control unit 10B includes a target road surface reaction torque calculation section 19B (not shown), a disturbance occurrence detection section 20B (not shown), and an assist torque decision section 21B (not shown).

The target road surface reaction torque calculation section 19B calculates a target road surface reaction torque signal Talign_ref(s) based on the vehicle speed signal V(s) and a steered angle signal Ttire(s) obtained from the steered angle Ttire.

The disturbance occurrence detection section 20B detects the presence or absence of the occurrence of a disturbance to a vehicle based on an actual road surface reaction torque signal Talign_act(s) from a road surface reaction torque detection section 18 (not shown) and the target road surface reaction torque signal Talign_ref(s), and outputs a disturbance state signal Dist(s).

The assist torque decision section 21B outputs, based on the disturbance state signal Dist(s), an assist torque signal Tassist2(s) for making the second assist motor 43 generate an assist torque Tassist2.

The construction of this third embodiment other than the above is similar to that of the first embodiment, and a description thereof is omitted.

According to the vehicular steering apparatus of this third embodiment of the present invention, the steering mechanism 1B constitutes a steer-by-wire mechanism that is able to change the steering angle Ttire of the tires 9 independently of the steering wheel angle Theta of the steering wheel 2.

As a result, when the occurrence of a disturbance is detected, the steering reaction force Tassist1 due to the disturbance can be made zero, whereby it is possible to control the vehicle in a stabilizing manner without providing an unpleasant feeling upon occurrence of the disturbance to the driver.

In the above-mentioned third embodiment, description has been made by taking an example of the steer-by-wire mechanism as the front wheel steering mechanism that changes the steered angle Ttire of the tires 9 independently of the steering angle Theta of the steering wheel 2, but the present invention is not limited to this.

The front wheel steering mechanism may be an auxiliary steering angle superposition mechanism using a planetary gear mechanism, a differential gear mechanism, a harmonic drive, or the like.

In this case, too, advantageous effects similar to those of the above-mentioned third embodiment can be achieved.

In addition, the road surface reaction torque detector 12 in the above-mentioned first through third embodiments is a load cell mounted on each tire 9, and outputs an amount of deformation of a strain gauge mounted on the load cell as the actual road surface reaction torque Talign.

However, the present invention is not limited to this, and the road surface reaction torque detector may calculate the actual road surface reaction torque Talign according to another method, which is disclosed, for example, in Japanese patent laid-open No. 2003-312521.

In this case, the road surface reaction torque detector first calculates a steering column reaction torque Ttran from a steering torque Thdl and a detected motor current Imtr. Subsequently, an actual road surface reaction torque Talign is calculated by passing the steering column reaction torque Ttran through a low-pass filter. The low-pass filter has a time constant which is decided in accordance with a vehicle speed V and a motor speed Smtr.

In this case, too, the operational or advantageous effects similar to those of the above-mentioned first through third embodiments can be achieved.

Moreover, in the first through third embodiments, in case where any of the actual road surface reaction torque signal Talign_act(s), the target road surface reaction torque signal Talign_ref(s), the actual road surface reaction torque change rate signal dTalign_act(s) and the target road surface reaction torque change rate signal dTalign_ref(s) is oscillatory for example due to electrical noise or the like, the disturbance occurrence detection sections 20, 20A may include a specific frequency removal unit such as a low-pass filter or the like.

In this case, an influence due to the high frequency components of a disturbance can be reduced.

Also, although in the above-mentioned first through third embodiments, the steered angle of the front wheel tires is controlled, the present invention is not limited to this, but the steered angle of rear wheel tires may be controlled.

At this time, the steering mechanism is further provided with a rear wheel steering mechanism (not shown) that changes the steered angle of the rear wheel tires of the vehicle. In addition, the control unit (rear wheel steered angle control unit) calculates an assist torque based on the disturbance state signal Dist(s), and controls the steered angle of the rear wheel tires in accordance with the assist torque thus calculated.

In this case, it is possible to perform the stabilization control of the vehicle in a more appropriate manner.

Further, although in the above-mentioned first through third embodiments, the steering mechanism is controlled so as to perform the stabilization control of the vehicle, the present invention is not limited to this.

For example, the control unit may output a disturbance state signal Dist(s) to an ESC (Electronic Stability Control) system (brake force control apparatus) that can control brake forces on four wheels of the vehicle, whereby an output signal from the ESC system can be changed.

In this case, the stabilization control of the vehicle can be carried out in a further appropriate manner.

While the invention has been described in terms of preferred embodiments, those skilled in the art will recognize that the invention can be practiced with modifications within the spirit and scope of the appended claims.

What is claimed is:

1. A vehicular steering apparatus comprising:
   a road surface reaction torque detection unit that detects an actual road surface reaction torque which is received by a wheel of a vehicle from a road surface;
   a vehicle speed detection unit that detects a vehicle speed of the vehicle;
   an angle detection unit that detects a steering wheel angle of a steering wheel of the vehicle or a steered angle of the wheel;
   a target road surface reaction torque calculation unit that calculates a target road surface reaction torque based on the vehicle speed and an output of the angle detection unit; and a disturbance occurrence detection unit that detects an occurrence of a disturbance to the vehicle and outputs a disturbance state signal;

wherein the disturbance occurrence detection unit includes a sign comparison means for making a comparison between positive or negative signs of the actual road surface reaction torque and the target road surface reaction torque to determine if the sign of the actual road surface reaction torque coincides with the sign of the target road surface reaction torque.

2. The vehicular steering apparatus as set forth in claim 1, wherein the disturbance occurrence detection unit includes a deviation calculation unit that calculates, as a state of the disturbance, a deviation between the actual road surface reaction torque and the target road surface reaction torque.

3. The vehicular steering apparatus as set forth in claim 1, wherein the disturbance occurrence detection unit includes a ratio calculation unit that calculates, as a state of the disturbance, a ratio between the actual road surface reaction torque and the target road surface reaction torque.

4. The vehicular steering apparatus as set forth in claim 1, wherein the disturbance occurrence detection unit includes a correction unit that corrects an output of the deviation calculation unit or the ratio calculation unit based on the vehicle speed.

5. The vehicular steering apparatus as set forth in claim 1, further comprising:

a steering torque detection unit that detects a steering torque generated by a driver of the vehicle;

an assist motor that generates an assist torque for assisting the steering torque; and an assist torque decision unit that decides the assist torque;

wherein the assist torque decision unit includes a disturbance compensation unit that calculates a disturbance compensation torque for compensating for the assist torque based on the disturbance state signal.

6. The vehicular steering apparatus as set forth in claim 1, further comprising:

a front wheel steering mechanism that changes a steered angle of a front wheel of the vehicle independently of the steering wheel angle of the steering wheel; and a front wheel steering angle control unit that controls the steered angle of the front wheel based on the disturbance state signal.

7. The vehicular steering apparatus as set forth in claim 1, further comprising:

a rear wheel steering mechanism that changes a steered angle of a rear wheel of the vehicle independently of the steering wheel angle of the steering wheel; and a rear wheel steered angle control unit that controls the steered angle of the rear wheel based on the disturbance state signal.

8. The vehicular steering apparatus as set forth in claim 1, wherein an output signal from a brake force control device for braking the vehicle is changed based on the disturbance state signal.

* * * * *